(12) United States Patent
Wu

(10) Patent No.: US 10,757,685 B2
(45) Date of Patent: Aug. 25, 2020

(54) DEVICE AND METHOD OF PERFORMING DATA TRANSMISSION IN BANDWIDTH PARTS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/029,672

(22) Filed: Jul. 9, 2018

(65) Prior Publication Data

US 2019/0014556 A1 Jan. 10, 2019

Related U.S. Application Data

(60) Provisional application No. 62/530,282, filed on Jul. 9, 2017.

(51) Int. Cl.
*H04L 1/18* (2006.01)
*H04W 72/04* (2009.01)

(52) U.S. Cl.
CPC ........... *H04W 72/04* (2013.01); *H04L 1/1822* (2013.01); *H04L 1/1845* (2013.01); *H04L 1/1861* (2013.01); *H04L 1/1893* (2013.01)

(58) Field of Classification Search
CPC ... H04L 1/1822; H04L 1/1845; H04L 1/1861; H04L 1/1893; H04W 72/04
USPC ....................................................... 370/329
See application file for complete search history.

(56) References Cited

U.S. PATENT DOCUMENTS

| 2011/0075624 A1* | 3/2011 | Papasakellariou .... H04L 5/0053 370/329 |
| 2015/0365931 A1* | 12/2015 | Ng ........................ H04L 1/1812 370/329 |
| 2018/0279289 A1* | 9/2018 | Islam .................... H04L 5/0094 |

FOREIGN PATENT DOCUMENTS

EP 2 141 852 A1 1/2010

OTHER PUBLICATIONS

Search Report dated Dec. 5, 2018 for EP application No. 18182504.3, pp. 1~5.
Huawei, HiSilicon, "Asynchronous HARQ Procedure in NR", 3GPP TSG-RAN WG2 Ad Hoc, R2-1700091, Jan. 17-19, 2017, Spokane, USA, XP051210677, pp. 1-3.

* cited by examiner

*Primary Examiner* — Melvin C Marcelo
*Assistant Examiner* — Natali Pascual Peguero
(74) *Attorney, Agent, or Firm* — Winston Hsu

(57) ABSTRACT

The present invention provides a method and a communication device for performing transmission(s) or reception(s) on BWPs associated to a carrier or a cell by using the same Hybrid Automatic Repeat Request (HARQ) entity and performing transmission(s) or reception(s) on BWPs associated to different carriers or cells by using different HARQ entities.

14 Claims, 6 Drawing Sheets

DEVICE AND METHOD OF PERFORMING DATA TRANSMISSION IN BANDWIDTH PARTS

CROSS REFERENCE TO RELATED APPLICATIONS

This application claims the benefit of U.S. Provisional Application No. 62/530,282, filed on Jul. 9, 2017, which is incorporated herein by reference.

BACKGROUND OF THE INVENTION

1. Field of the Invention

The present invention relates to a device and a method used in a wireless communication system, and more particularly, to a device and a method of performing data transmission in bandwidth parts.

2. Description of the Prior Art

A new radio (NR) system, developed recently in 3rd generation partnership project (3GPP), is regarded as a NR interface and radio network architecture that provides a high data rate, low latency, packet optimization, and improved system capacity and coverage. In the NR system, a radio access network (RAN) includes a plurality of NR base stations (BSs) (i.e., gNBs) and communicates with a plurality of user equipments (UEs).

SUMMARY OF THE INVENTION

The present invention therefore provides a communication device and method for performing data transmission in bandwidth parts to solve the abovementioned problem.

A communication device for performing data transmission in bandwidth parts (BWPs) comprises a storage device for storing instructions and a processing circuit coupled to the storage device. The storage device stores, and the processing circuit is configured to execute instructions of receiving a first command from a base station (BS) in a first BWP, wherein the first command comprises a first Hybrid Automatic Repeat Request (HARQ) process number and a first uplink (UL) grant which assigns at least one first physical resource block (PRB); transmitting a first transmission to the BS on the at least one first PRB according to a first HARQ process of a first HARQ entity, wherein the communication device associates the first HARQ process to the first HARQ process number; receiving a second command from the BS in a second BWP, wherein the second command comprises a second HARQ process number and a second UL grant which assigns at least one second PRB; and transmitting a second transmission to the BS on the at least second PRB according to a second HARQ process of the first HARQ entity, wherein the communication device associates the second HARQ process to the second HARQ process number.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
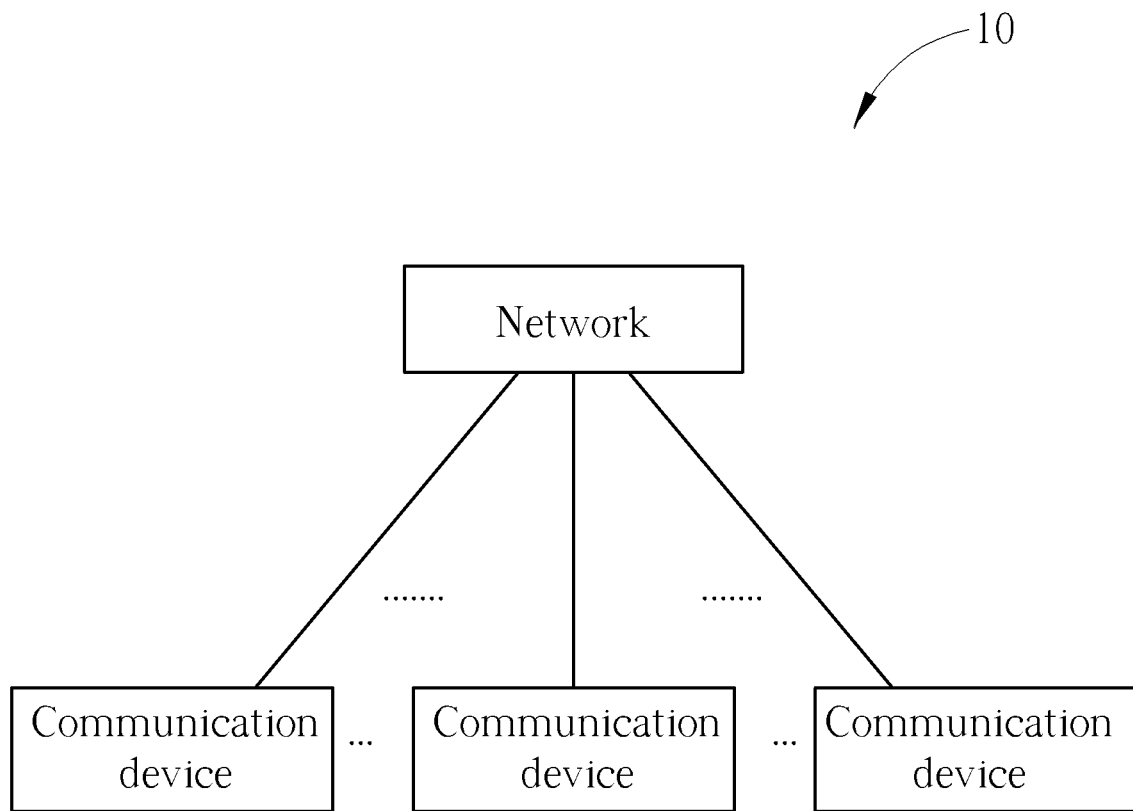
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, i.e., frequency-division duplexing (FDD), time-division duplexing (TDD) or flexible duplexing.

In FIG. 1, the network and the communication devices are simply utilized for illustrating the structure of the wireless communication system 10. The network may include a radio access network (RAN) and a core network (CN). The RAN may include at least one base station (BS). The RAN may be a new radio (NR)-RAN (or called a fifth generation (5G) RAN or a next generation (NG) RAN), an evolved NR-RAN or a sixth generation (6G) RAN. The CN may be an Evolved Packet Core (EPC) network or a 5G CN (5GCN).

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
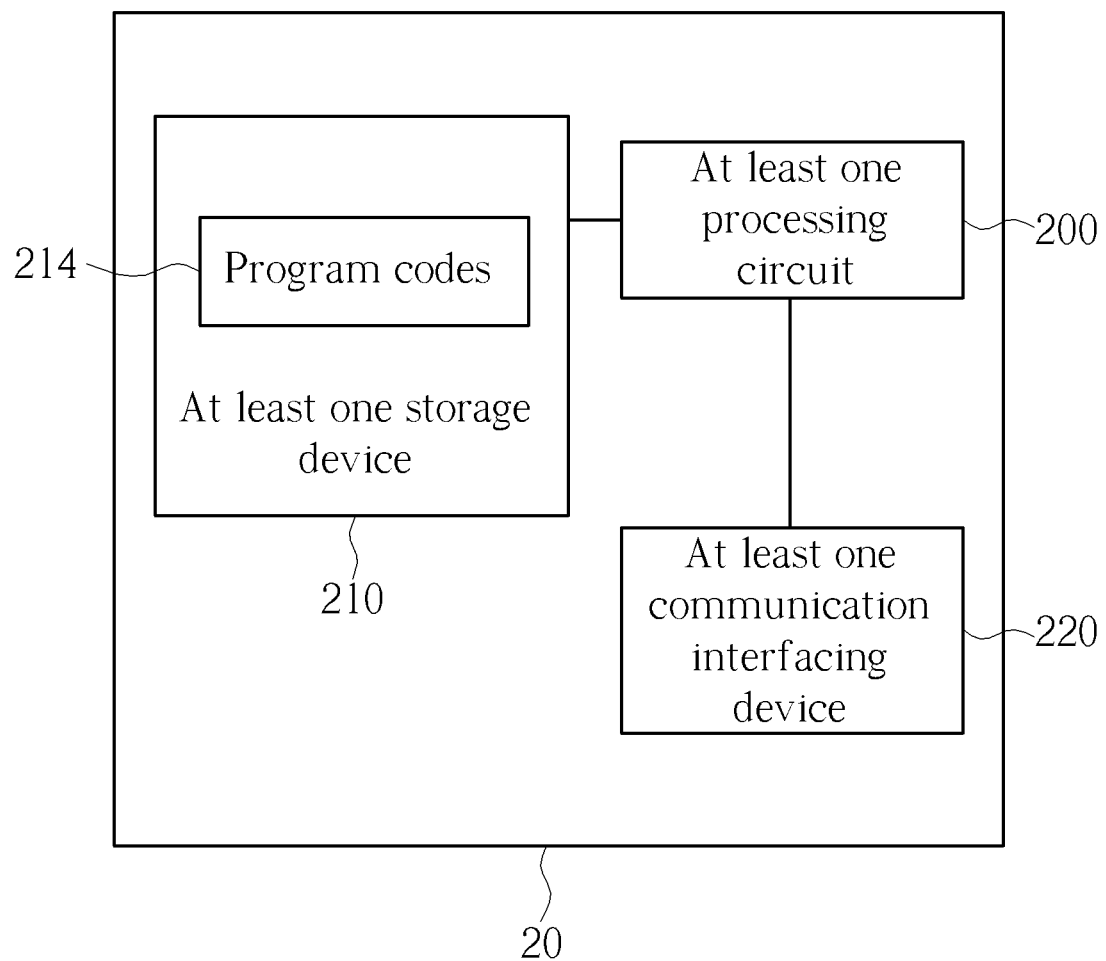
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used to represent a communication device in FIG. 1, to simplify the illustration of the examples.

Figure 3:
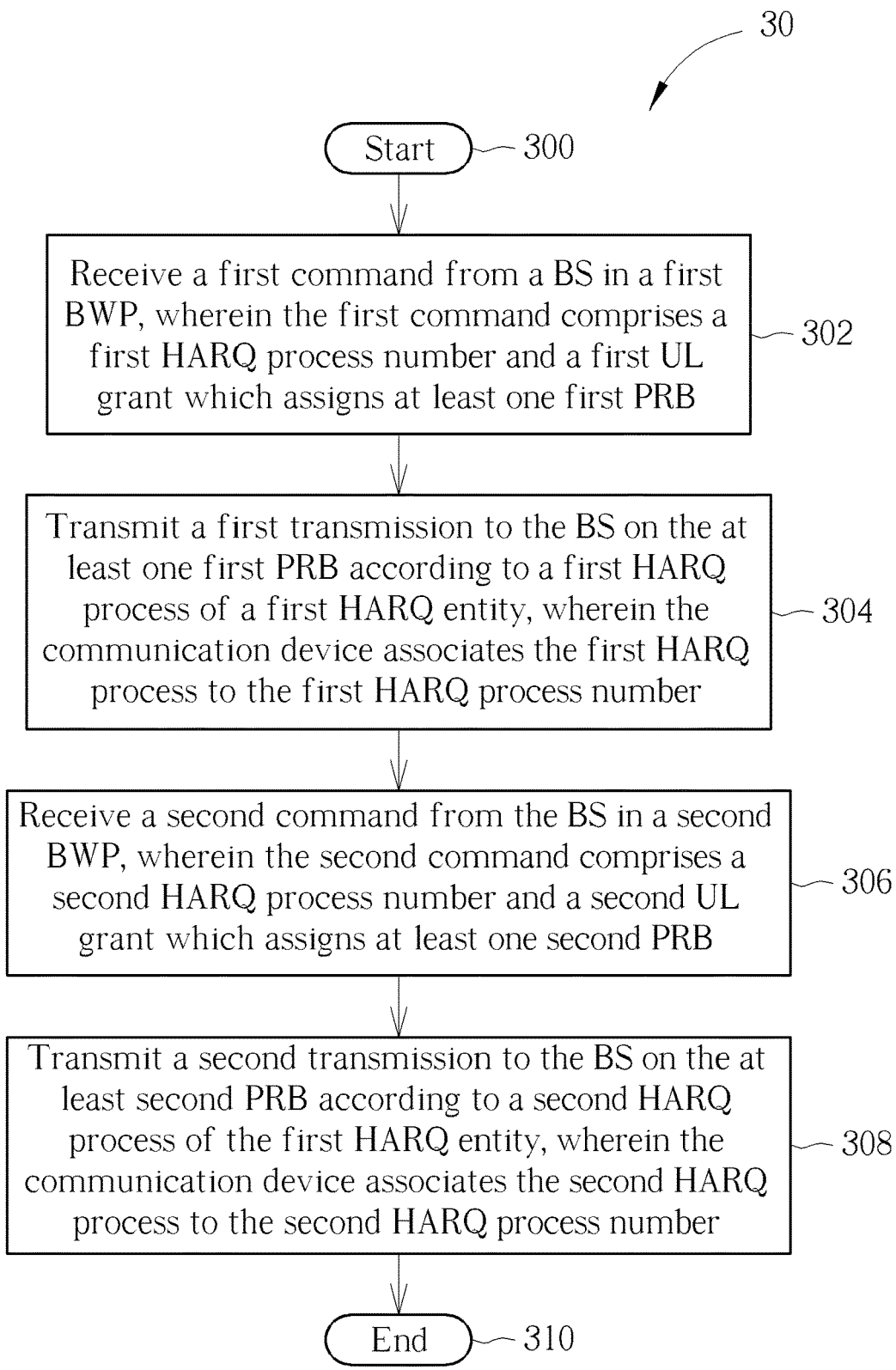
FIG. 3 is a flowchart of a process according to an example of the present invention.

A process 30 in FIG. 3 is utilized in a UE, and includes the following steps:

Step 300: Start.

Step 302: Receive a first command from a BS in a first bandwidth part (BWP), wherein the first command comprises a first Hybrid Automatic Repeat Request (HARQ) process number and a first UL grant which assigns at least one first physical resource block (PRB).

Step 304: Transmit a first transmission to the BS on the at least one first PRB according to a first HARQ process of a first HARQ entity, wherein the communication device associates the first HARQ process to the first HARQ process number.

Step 306: Receive a second command from the BS in a second BWP, wherein the second command comprises a second HARQ process number and a second UL grant which assigns at least one second PRB.

Step 308: Transmit a second transmission to the BS on the at least second PRB according to a second HARQ process of the first HARQ entity, wherein the communication device associates the second HARQ process to the second HARQ process number.

Step 310: End.

In one example, the first BWP and the second BWP belong to a first carrier or a first cell.

In one example, the first command includes a new data indicator (NDI) indicating that the first transmission is a new transmission (or initial transmission) or a retransmission. In one example, the second command includes a NDI indicating that the second transmission is a new transmission (or initial transmission) or a retransmission.

In one example, the UE transmits the first transmission according to the first command, a first numerology and the first HARQ process, and transmits the second transmission according to the second command, a second numerology and the second HARQ process.

In one example, the first command includes a first field explicitly indicating the first numerology, and the UE uses the first numerology for the first transmission according to the first field. In one example, the second command includes a second field explicitly indicating the second numerology, and the UE uses the second numerology for the second transmission according to the second field.

In one example, the UE is configured to use the first numerology for transmissions on the at least one first PRB and to use the second numerology for transmissions on the at least one second PRB, by the BS via at least one broadcast message broadcasted to a plurality of UEs or via at least one dedicated message specifically transmitted to the UE.

In one example, the UE is configured to use the first numerology for transmissions in a third BWP and to use the second numerology for transmissions in a fourth BWP, by the BS. In one example, the at least one first PRB may be in the third BWP, and the at least one second PRB may be in the fourth BWP. The first BWP and the third BWP may be the same BWP or different BWPs. The second BWP and the fourth BWP may be the same BWP or different BWPs. The first BWP, the second BWP, the third BWP and the fourth BWP may belong to the first carrier or the first cell.

In one example, the UE receives a third command from the BS in the first BWP, wherein the third command includes the first HARQ process number and a third UL grant which assigns at least one third PRB. The third command may indicate a third transmission next to the first transmission for the first HARQ process of the first HARQ entity. That is, the UE identifies the first HARQ process of the first HARQ entity to be used according to the first HARQ process number. The UE transmits the third transmission to the BS according to the first HARQ process. In one example, the third command includes a NDI indicating that the third transmission is a new transmission or a retransmission. When the third command indicates that the third transmission is the new transmission, the UE clears a first HARQ buffer associated to the first HARQ process. When the third command indicates that the third transmission is the retransmission, the UE transmits a retransmission of the first transmission.

In one example, the UE receives a fourth command from the BS in the second BWP, wherein the fourth command includes the second HARQ process number and a fourth UL grant which assigns at least one fourth PRB. The fourth command may indicate a fourth transmission next to the second transmission for the second HARQ process of the first HARQ entity. That is, the UE identifies the second HARQ process of the first HARQ entity to be used according to the second HARQ process number. The UE transmits the fourth transmission to the BS according to the second HARQ process. In one example, the fourth command includes a NDI indicating that the fourth transmission is a new transmission or a retransmission. When the fourth command indicates that the fourth transmission is the new transmission, the UE clears a second HARQ buffer associated to the second HARQ process. When the fourth command indicates that the fourth transmission is the retransmission, the UE transmits a retransmission of the second transmission.

In one example, the UE receives a fifth command from the BS in a fifth BWP, wherein the fifth command includes the first HARQ process number and a fifth UL grant which assigns at least one fifth PRB. The UE may transmit a fifth transmission to the BS on the at least one fifth PRB in a sixth BWP according to a first HARQ process of a second HARQ entity different from the first HARQ entity, wherein the UE associates the first HARQ process of the second HARQ entity to the first HARQ number. In one example, the fifth command includes a NDI which has a value for a new transmission which the BS intends to receive. The above examples solve a problem that the UE may incorrectly transmit the fifth transmission as a retransmission of the first transmission according to the first HARQ process of the first HARQ entity.

In one example, the fifth BWP and the sixth BWP belong to a second carrier different from the first carrier or belong to a second cell different from the first cell. In one example, the fifth BWP belongs to a second carrier and the sixth BWP belongs to a third carrier. The fifth BWP and the sixth BWP may be the same BWP or different BWPs.

In one example, the UE determines to use a HARQ process of the first HARQ entity to transmit transmissions, in response to commands indicating a HARQ process number and received in any BWP belonging to the first carrier or the first cell. In one example, the UE determines to use a HARQ process of the second HARQ entity to transmit transmissions, in response to commands indicating the HARQ process number and received in any BWP belonging to the second/third carrier or the second cell.

Figure 4:
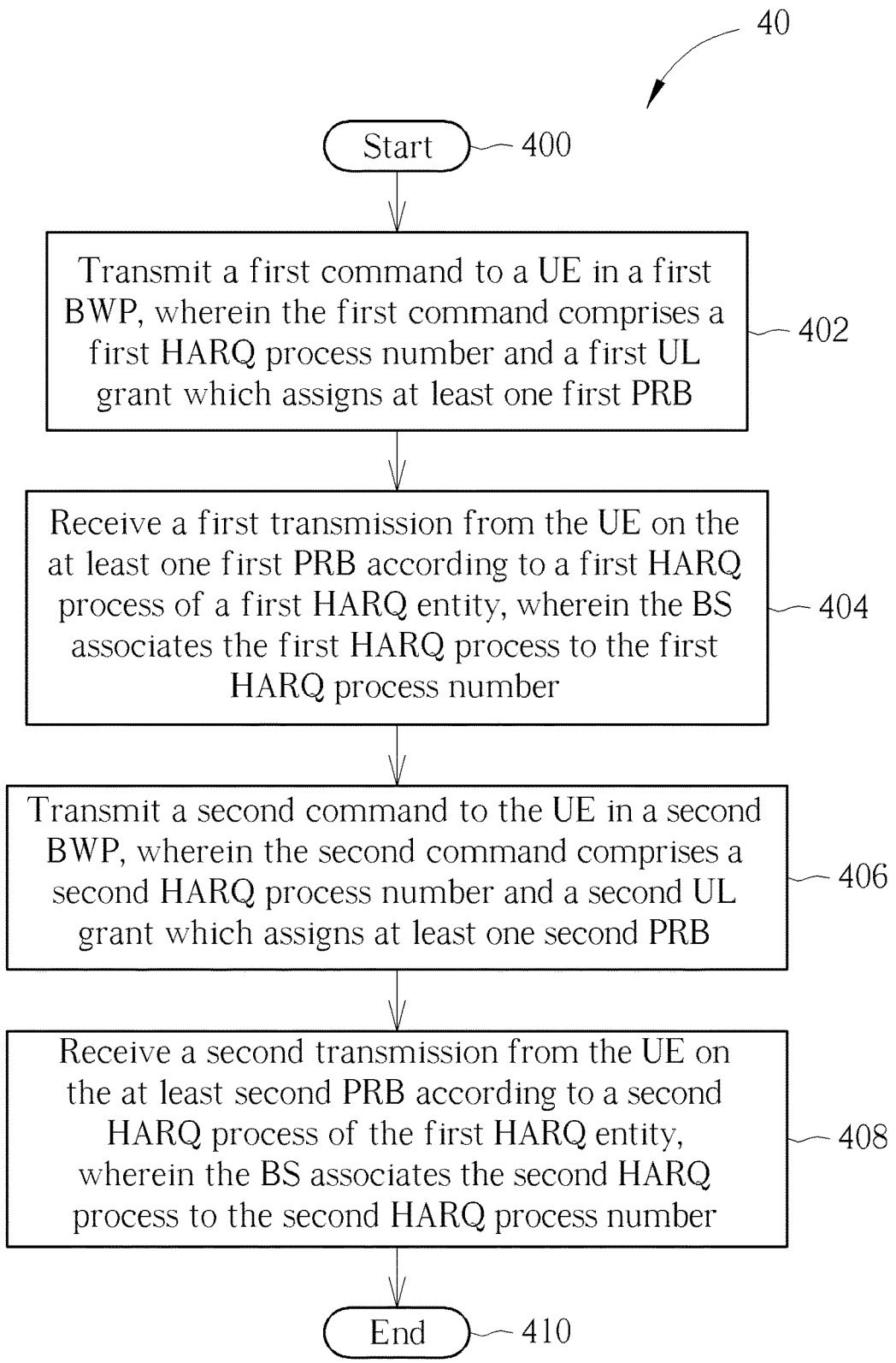
FIG. 4 is a flowchart of a process according to an example of the present invention.

A process 40 in FIG. 4 is utilized in a BS of a network in FIG. 1, and includes the following steps:

Step 400: Start.

Step 402: Transmit a first command to a UE in a first BWP, wherein the first command comprises a first HARQ process number and a first UL grant which assigns at least one first PRB.

Step 404: Receive a first transmission from the UE on the at least one first PRB according to a first HARQ process of a first HARQ entity, wherein the BS associates the first HARQ process to the first HARQ process number.

Step 406: Transmit a second command to the UE in a second BWP, wherein the second command comprises a second HARQ process number and a second UL grant which assigns at least one second PRB.

Step 408: Receive a second transmission from the UE on the at least second PRB according to a second HARQ process of the first HARQ entity, wherein the BS associates the second HARQ process to the second HARQ process number.

Step 410: End.

In one example, the BS includes (e.g., stores) the first transmission in a first soft buffer associated to the first HARQ process, and includes (e.g., stores) the second transmission in a second soft buffer associated to the second HARQ process.

In one example, the BS transmits the third command to the UE in the first BWP as described in the examples of the process 30. The BS receives the third transmission (on the at least third PRB) according to the third command/the third UL grant and the first HARQ process of the first HARQ entity. In one example, the BS includes a NDI indicating that the third transmission is a new transmission, when the BS receives the first transmission and correctly decodes the first transmission. In one example, the BS includes a NDI indicating that the third transmission is a retransmission, when the BS fails to decode the first transmission. When the third command indicates that the third transmission is the new transmission, the BS clears the first soft buffer associated to the first HARQ process. When the third command indicates that the third transmission is the retransmission, the BS stores the retransmission in the first soft buffer with the first transmission and decodes a combination of the retransmission of the first transmission and the first transmission (i.e., HARQ combining).

In one example, the BS transmits the fourth command to the UE in the second BWP as described in the examples of the process 30. The BS receives the fourth transmission (on the at least fourth PRB) according to the fourth command/the fourth UL grant and the second HARQ process. In one example, the BS includes a NDI indicating that the fourth transmission is a new transmission, when the BS receives the second transmission and correctly decodes the second transmission. In one example, the BS includes a NDI indicating that the fourth transmission is a retransmission, when the BS fails to decode the second transmission. When the fourth command indicates that the fourth transmission is the new transmission, the BS clears the second soft buffer associated to the second HARQ process. When the fourth command indicates that the fourth transmission is the retransmission, the BS stores the retransmission in the second soft buffer with the second transmission and decodes a combination of the retransmission of the second transmission and the second transmission (i.e., HARQ combining).

In one example, the BS transmits the fifth command to the communication device in the fifth BWP as described in the examples of the process 30, wherein the fifth command includes the first HARQ process number and the fifth UL grant which assigns at least one fifth PRB. The BS may receive the fifth transmission from the UE (on the at least one fifth PRB) according to the fifth command/the fifth UL grant (e.g., in the sixth BWP) and a first HARQ process of a second HARQ entity different from the first HARQ entity, wherein the BS associates the first HARQ process of the second HARQ entity to the first HARQ number. Thus, the BS correctly combines the fifth transmission with the first transmission or the retransmission of the first transmission in the first soft buffer of the first HARQ process of the first HARQ entity.

The examples of the process 30 may be applied to the process 40, and are not narrated herein.

Figure 5:
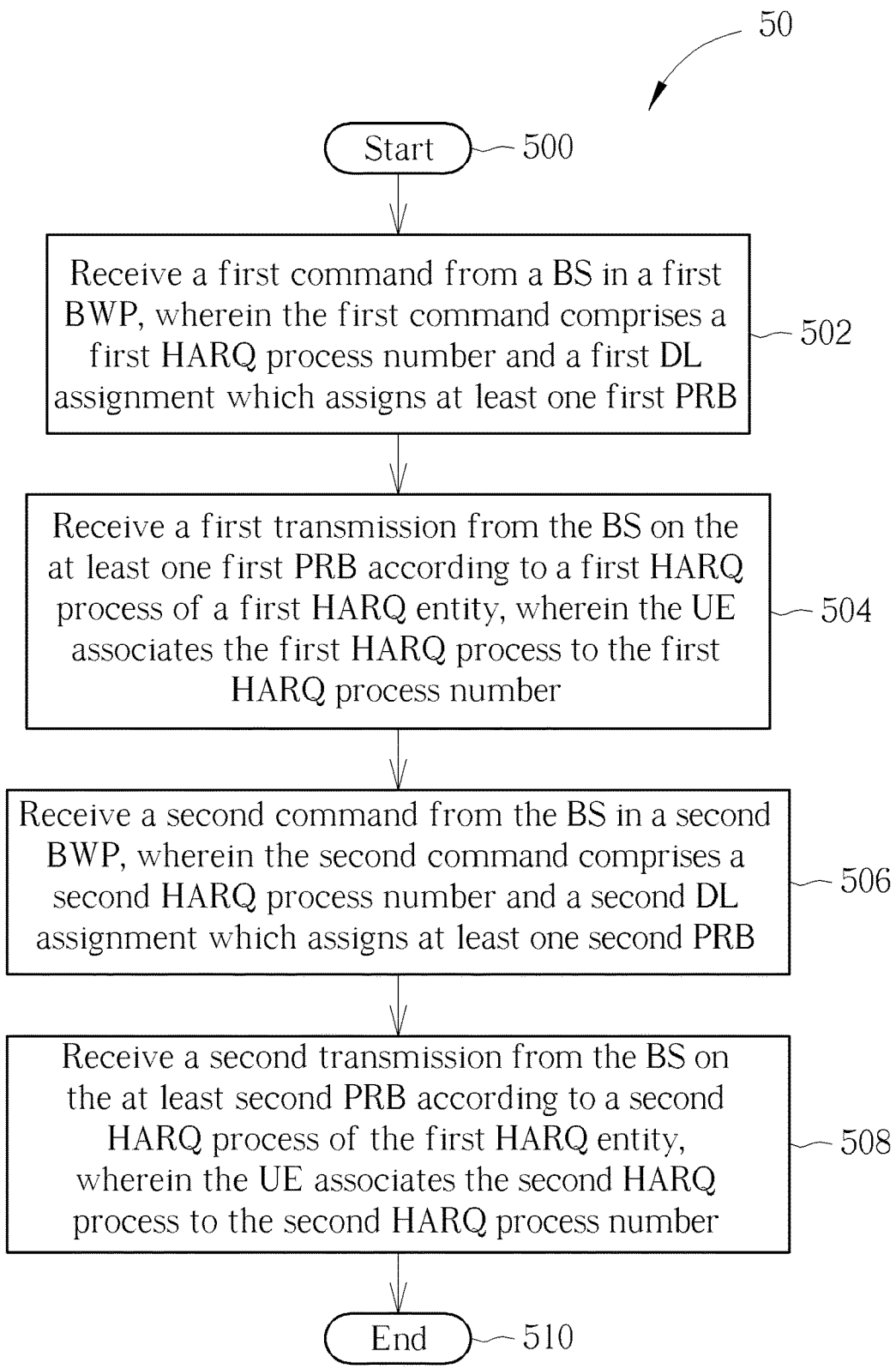
FIG. 5 is a flowchart of a process according to an example of the present invention.

A process 50 in FIG. 5 is utilized in a UE, and includes the following steps:

Step 500: Start.

Step 502: Receive a first command from a BS in a first BWP, wherein the first command comprises a first HARQ process number and a first DL assignment which assigns at least one first PRB.

Step 504: Receive a first transmission from the BS on the at least one first PRB according to a first HARQ process of a first HARQ entity, wherein the UE associates the first HARQ process to the first HARQ process number.

Step 506: Receive a second command from the BS in a second BWP, wherein the second command comprises a second HARQ process number and a second DL assignment which assigns at least one second PRB.

Step 508: Receive a second transmission from the BS on the at least second PRB according to a second HARQ process of the first HARQ entity, wherein the UE associates the second HARQ process to the second HARQ process number.

Step 510: End.

In one example, the first BWP and the second BWP belong to a first carrier or a first cell.

In one example, the UE includes (e.g., stores) the first transmission in a first soft buffer associated to the first HARQ process, and includes (e.g., stores) the second transmission in a second soft buffer associated to the second HARQ process.

In one example, the first command includes a NDI indicating that the first transmission is a new transmission (or initial transmission) or a retransmission. In one example, the second command includes a NDI indicating that the second transmission is a new transmission (or initial transmission) or a retransmission.

In one example, the UE receives the first transmission according to the first command, a first numerology and the first HARQ process, and receives the second transmission according to the second command, a second numerology and the second HARQ process.

In one example, the first command includes a first field explicitly indicating the first numerology, and the UE uses the first numerology to receive the first transmission according to the first field. In one example, the second command includes a second field explicitly indicating the second numerology, and the UE uses the second numerology to receive the second transmission according to the second field.

In one example, the UE is configured to use the first numerology to receive transmissions on the at least one first PRB (e.g., in the first BWP) and to use the second numerology to receive transmissions on the at least one second PRB (e.g., in the second BWP), by the BS via at least one broadcast message broadcasted to a plurality of UEs or via at least one dedicated message specifically transmitted to the UE.

In one example, the UE transmits a first HARQ acknowledgement to the BS, when the UE correctly decodes the first transmission. In one example, the UE transmits a first HARQ negative acknowledgement to the BS, when the UE fails to decode the first transmission. In one example, the UE transmits a second HARQ acknowledgement to the BS, when the UE correctly decodes the second transmission. In one example, the UE transmits a second HARQ negative acknowledgement to the BS, when the UE fails to decode the second transmission.

In one example, the UE receives a third command from the BS in the first BWP, wherein the third command includes the first HARQ process number and a third DL assignment which assigns at least one third PRB. The third command may indicate a third transmission next to the first transmission for the first HARQ process of the first HARQ entity. That is, the UE identifies the first HARQ process of the first HARQ entity to be used according to the first HARQ process number. The UE receives the third transmission in the first BWP from the BS according to the third command/the third DL assignment, and the first HARQ process. In one example, the third command includes a NDI indicating that the third transmission is a new transmission or a retransmission. When the third command indicates that the third transmission is the new transmission, the UE clears the first soft buffer associated to the first HARQ process. When the third command indicates that the third transmission is the retransmission, the UE stores the retransmission in the first soft buffer with the first transmission and decodes a combination of the retransmission of the first transmission and the first transmission (i.e., HARQ combining).

In one example, the UE receives a fourth command from the BS in the second BWP, wherein the fourth command includes the second HARQ process number and a fourth DL assignment which assigns at least one fourth PRB. The fourth command may indicate a fourth transmission next to the second transmission for the second HARQ process of the first HARQ entity. That is, the UE identifies the second HARQ process of the first HARQ entity to be used according to the second HARQ process number. The UE receives the fourth transmission in the second BWP from the BS according to the fourth command/the fourth DL assignment and the second HARQ process. In one example, the fourth command includes a NDI indicating that the fourth transmission is a new transmission or a retransmission. When the fourth command indicates that the fourth transmission is the new transmission, the UE clears the second soft buffer associated to the second HARQ process. When the fourth command indicates that the fourth transmission is the retransmission, the UE stores the retransmission in the second soft buffer with the second transmission and decodes a combination of the retransmission of the second transmission and the second transmission (i.e., HARQ combining).

In one example, the UE receives a fifth command from the BS in a third BWP, wherein the fifth command includes the first HARQ process number and a fifth DL assignment which assigns at least one fifth PRB. The UE may receive a fifth transmission from the BS on the at least one fifth PRB in the third BWP according to the fifth command/the fifth DL assignment and a first HARQ process of a second HARQ entity different from the first HARQ entity, wherein the UE associates the first HARQ process of the second HARQ entity to the first HARQ number. In one example, the fifth command includes a NDI which has a value for a new transmission which the BS intends to transmit. The above examples solves a problem that the UE may incorrectly combine the fifth transmission (i.e., as a retransmission of the first transmission) with the first transmission in the first soft buffer, when using the first HARQ process of the first HARQ entity.

The first, second and third BWPs are different BWPs and may or may not be overlapped. In one example, the third BWP belongs to a second carrier different from the first carrier or belong to a second cell different from the first cell.

In one example, the UE determines to use a HARQ process of the first HARQ entity to receive transmissions, in response to commands indicating a HARQ process number and received in any BWP belonging to the first carrier or the first cell. In one example, the UE determines to use a HARQ process of the second HARQ entity to receive transmissions, in response to commands indicating the HARQ process number and received in any BWP belonging to the second carrier.

Figure 6:
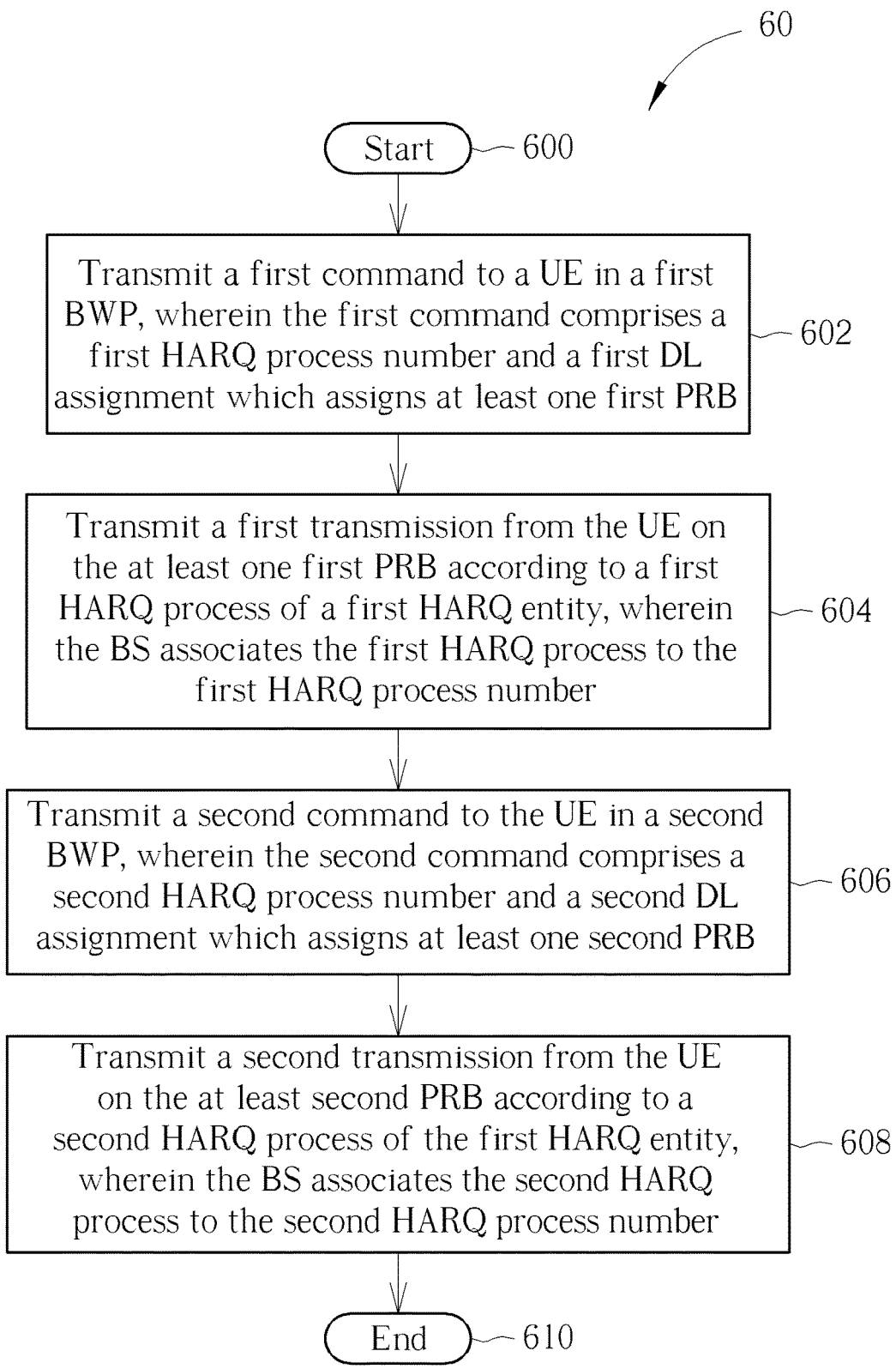
FIG. 6 is a flowchart of a process according to an example of the present invention.

A process 60 in FIG. 6 is utilized in a BS of a network in FIG. 1, and includes the following steps:

Step 600: Start.

Step 602: Transmit a first command to a UE in a first BWP, wherein the first command comprises a first HARQ process number and a first DL assignment which assigns at least one first PRB.

Step 604: Transmit a first transmission from the UE on the at least one first PRB according to a first HARQ process of a first HARQ entity, wherein the BS associates the first HARQ process to the first HARQ process number.

Step 606: Transmit a second command to the UE in a second BWP, wherein the second command comprises a second HARQ process number and a second DL assignment which assigns at least one second PRB.

Step 608: Transmit a second transmission from the UE on the at least second PRB according to a second HARQ process of the first HARQ entity, wherein the BS associates the second HARQ process to the second HARQ process number.

Step 610: End.

In one example, the BS receives a first HARQ acknowledgement from the UE, e.g., in the first BWP or in a UL BWP associated to the first BWP, when the UE correctly decodes the first transmission. In one example, the BS receives a first HARQ negative acknowledgement from the UE, when the UE fails to decode the first transmission. In one example, the BS receives a second HARQ acknowledgement from the UE, when the UE correctly decodes the second transmission (e.g., CRC check is successful). In one example, the BS receives a second HARQ negative acknowledgement from the UE in the second BWP or in a UL BWP associated to the second BWP, when the UE fails to decode the second transmission.

In one example, the BS transmits the third command to the UE in the first BWP or in the second BWP as described in the examples of the process 50. The BS transmits the third transmission (e.g., in the first BWP) to the UE according to the third command and the first HARQ process. In one example, the third command includes a NDI indicating that the third transmission is a new transmission or a retransmission. When the third command indicates that the third transmission is the new transmission, the BS clears a first HARQ buffer associated to the first HARQ process. When the third command indicates that the third transmission is the retransmission, the BS transmits a retransmission of the first transmission.

In one example, the BS transmits a fourth command to the UE in the first BWP or in the second BWP as described in the examples of the process 50. The BS transmits the fourth transmission (e.g., in the second BWP) to the UE according to the fourth command and the second HARQ process. In one example, the fourth command includes a NDI indicating that the fourth transmission is a new transmission or a retransmission. When the fourth command indicates that the fourth transmission is the new transmission, the BS clears a second HARQ buffer associated to the second HARQ process. When the fourth command indicates that the fourth transmission is the retransmission, the BS transmits a retransmission of the second transmission.

In one example, the BS transmits the fifth command to the UE in a third BWP, wherein the fifth command includes the first HARQ process number and a fifth DL assignment which assigns at least one fifth PRB. The BS may transmit the fifth transmission to the UE on the at least one fifth PRB in the fourth BWP according to a first HARQ process of a second HARQ entity different from the first HARQ entity, wherein the BS associates the first HARQ process of the second HARQ entity to the first HARQ number.

In one example, the BS determines to use a HARQ process of the first HARQ entity to transmit transmissions, in response to commands indicating a HARQ process number and transmitted in any BWP belonging to the first carrier or the first cell. In one example, the BS determines to use a HARQ process of the second HARQ entity to transmit transmissions, in response to commands indicating the HARQ process number and transmitted in any BWP belonging to the second/third carrier or the second cell.

The examples of the process 50 may be applied to the process 60, and are not narrated herein. The following examples may be applied to the processes 30-60.

In one example, the first numerology or the second numerology is defined by subcarrier spacing(s) (e.g., 15 kHz, 30 kHz, 60 kHz or 120 kHz) and cyclic prefix (CP) overhead. In one example, the first numerology and the second numerology are the same or different. For example, the first numerology and the second numerology have same or different subcarrier spacings. For example, the first numerology and the second numerology have CPs with same or different lengths.

In one example, the at least one broadcast message includes system information block(s) or master information block(s). In one example, the at least one dedicated message includes RRC message(s) (e.g., RRCReconfiguration message(s), RRCSetup message(s) and/or RRCResume message(s)).

In one example, the commands above are in formats of DCIs received in different occasions on one or more physical DL control channel(s) (PDCCH(s)). Each of the DCIs may have a CRC scrambled by a RNTI of the UE (e.g., cell RNTI).

In one example, the UE is configured by the BS to simultaneously transmit and/or receive in at least two of the BWPs described above. In one example, the at least two of the BWPs belongs to different carriers or cells. In one example, the UE performs transmission(s) in only one of the BWPs described above. In one example, the UE performs reception(s) in only one of the BWPs described above.

In one example, the BWPs above may or may not be overlapped. The first carrier may be denitrified by a first Absolute Radio Frequency Channel Number (ARFCN). The second carrier may be denitrified by a second ARFCN. The third carrier may be denitrified by a third ARFCN.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the BS. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for performing data transmission in BWPs. A BS and a UE determine to use HARQ processes of the same HARQ entity to communicate (i.e., transmit or receive) with (i.e., to or from) each other, in response to commands indicating a HARQ process number and transmitted in any BWP belonging to a carrier or a cell. The BS and the UE determine to use HARQ processes of different HARQ entities to communicate with each other, in response to commands indicating a HARQ process number and transmitted in any BWP belonging to different carriers or different cells. Thus, the problem of performing data transmission in BWPs is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for performing communication in bandwidth parts (BWPs), comprising:
   a storage device; and
   a processing circuit, coupled to the storage device, wherein the storage device stores, and the processing circuit is configured to execute instructions of:
   receiving a first command from a base station (BS) in a first BWP, wherein the first command comprises a first Hybrid Automatic Repeat Request (HARQ) process number and a first uplink (UL) grant which assigns at least one first physical resource block (PRB);
   transmitting a first transmission to the BS on the at least one first PRB according to a first HARQ process of a first HARQ entity, wherein the communication device associates the first HARQ process to the first HARQ process number;
   receiving a second command from the BS in a second BWP, wherein the second command comprises a second HARQ process number and a second UL grant which assigns at least one second PRB; and
   transmitting a second transmission to the BS on the at least second PRB according to a second HARQ process of the first HARQ entity, wherein the communication device associates the second HARQ process to the second HARQ process number.

2. The communication device of claim 1, wherein instructions further comprise:
   receiving a third command from the BS in a third BWP, wherein the third command comprises the first HARQ process number and a third UL grant which assigns at least one third PRB; and transmitting a third transmission to the BS on the at least one first PRB according to a first HARQ process of a second HARQ entity.

3. The communication device of claim 1, wherein the instructions further comprise:
   transmitting the first transmission according to a first numerology and the first HARQ process; and
   transmitting the second transmission according to a second numerology and the second HARQ process.

4. A base station (BS) for performing communication in bandwidth parts (BWPs), comprising:
   a storage device; and
   a processing circuit, coupled to the storage device, wherein the storage device stores, and the processing circuit is configured to execute instructions of:
   transmitting a first command to a communication device in a first bandwidth part (BWP), wherein the first command comprises a first Hybrid Automatic Repeat Request (HARQ) process number and a first uplink (UL) grant which assigns at least one first physical resource block (PRB);
   receiving a first transmission from the communication device on the at least one first PRB according to a first HARQ process of a first HARQ entity, wherein the BS associates the first HARQ process to the first HARQ process number;
   transmitting a second command to the communication device in a second BWP, wherein the second command comprises a second HARQ process number and a second UL grant which assigns at least one second PRB; and
   receiving a second transmission from the communication device on the at least second PRB according to a second HARQ process of the first HARQ entity, wherein the BS associates the second HARQ process to the second HARQ process number.

5. The BS of claim 4, wherein the BS comprises the first transmission in a first soft buffer associated to the first HARQ process, and comprises the second transmission in a second soft buffer associated to the second HARQ process.

6. The BS of claim 4, wherein the instructions further comprise:
   transmitting a third command to the communication device on a Physical Downlink (DL) Control Channel (PDCCH) in the first BWP, wherein the third command comprises the first HARQ process number and a third UL grant which assigns at least one third PRB; and
   receiving a third transmission from the communication device according to the first HARQ process of the first HARQ entity.

7. The BS of claim 4, wherein the instructions further comprise:
   transmitting a fourth command to the communication device on a PDCCH in the second BWP, wherein the fourth command comprises the second HARQ process number and a fourth UL grant which assigns at least one fourth PRB; and
   receiving a fourth transmission from the communication device according to the second HARQ process of the first HARQ entity.

8. The BS of claim 4, wherein the instructions further comprise:
   transmitting a fifth command to the communication device in a third BWP, wherein the fifth command comprises the first HARQ process number and a fifth UL grant which assigns at least one fifth PRB;
   associating a first HARQ process of a second HARQ entity to the first HARQ process number; and
   receiving a fifth transmission from the communication device according to the first HARQ process of the second HARQ entity.

9. A communication device for performing communication in bandwidth parts (BWPs), comprising:
   a storage device; and
   a processing circuit, coupled to the storage device, wherein the storage device stores, and the processing circuit is configured to execute instructions of:
   receiving a first command from a base station (BS) in a first BWP, wherein the first command comprises a first Hybrid Automatic Repeat Request (HARQ) process number and a first downlink (DL) assignment which assigns at least one first physical resource block (PRB);
   receiving a first transmission from the BS on the at least one first PRB according to a first HARQ process of a first HARQ entity, wherein the communication device associates the first HARQ process to the first HARQ process number;
   receiving a second command from the BS in a second BWP, wherein the second command comprises a second HARQ process number and a second DL assignment which assigns at least one second PRB; and
   receiving a second transmission from the BS on the at least second PRB according to a second HARQ process of the first HARQ entity, wherein the communication device associates the second HARQ process to the second HARQ process number.

10. The communication device of claim 9, wherein the instructions further comprise:
    storing the first transmission in a first soft buffer associated to the first HARQ process; and
    storing the second transmission in a second soft buffer associated to the second HARQ process.

11. The communication device of claim 9, wherein the instructions further comprise:
    receiving the first transmission according to a first numerology and the first HARQ process; and
    receiving the second transmission according to a second numerology and the second HARQ process.

12. The communication device of claim 9, the instructions further comprise:
    receiving a third command from the BS in the first BWP, wherein the third command comprises the first HARQ process number and a third DL assignment which assigns at least one third PRB; and
    receiving a third transmission from the BS according to the first HARQ process of the first HARQ entity.

13. The communication device of claim 9, wherein the instructions further comprise:
    receiving a fourth command from the BS in the second BWP, wherein the fourth command comprises the second HARQ process number and a fourth DL assignment which assigns at least one fourth PRB; and
    receiving a fourth transmission from the BS according to the second HARQ process of the first HARQ entity.

14. The communication device of claim 9, wherein the instructions further comprise:
   receiving a fifth command from the BS in a third BWP, wherein the fifth command comprises the first HARQ process number and a fifth DL assignment which assigns at least one fifth PRB;
   associating a first HARQ process of a second HARQ entity to the first HARQ process number; and
   receiving a fifth transmission from the BS according to the first HARQ process of the second HARQ entity.

* * * * *